United States Patent
Godinez, Jr.

[15] 3,696,758

[45] Oct. 10, 1972

[54] LOCOMOTIVE SIGNALING AND CONTROL SYSTEM

[72] Inventor: Peter A. Godinez, Jr., West Covina, Calif.

[73] Assignee: Genisco Technology Corporation, Compton, Calif.

[22] Filed: Dec. 18, 1969

[21] Appl. No.: 886,295

[52] U.S. Cl. ............105/61, 213/1.3, 307/9, 336/DIG. 2, 340/48
[51] Int. Cl. ............B61g 1/08, B61c 3/00
[58] Field of Search..340/48; 179/82; 105/61; 246/8; 178/43; 213/1.3, 212, 75 D; 307/9; 336/DIG. 2

[56] References Cited

UNITED STATES PATENTS

| | | |
|---|---|---|
| 2,379,664 | 7/1945 | Stanko..................336/DIG. 2 |
| 2,414,719 | 1/1947 | Cloud....................336/DIG. 2 |
| 3,384,033 | 5/1968 | Ruff.............................105/61 |
| 3,482,089 | 12/1969 | Raffel et al. .............105/61 X |
| 1,649,129 | 11/1927 | Schenck..................213/75 D |
| 3,482,089 | 12/1969 | Raffel......................105/61 X |
| 3,532,228 | 10/1970 | Beyer........................213/212 |

Primary Examiner—Arthur L. La Point
Assistant Examiner—George H. Libman
Attorney—Fraser and Bogucki

[57] ABSTRACT

A control system is disclosed permitting the control of a plurality of power traction units in railroad service from a single one of such units as the master control unit. Both indicator and command signaling are provided between the various units by means of inductive couplers mounted in the vicinity of the mechanical unit couplers. Frequency shift keying and redundant signal encoding are employed to provide a high degree of reliability with protection against failure and errors.

21 Claims, 6 Drawing Figures

INVENTOR.
PETER A. GODINEZ, JR.
BY
FRASER and BOGUCKI
ATTORNEYS

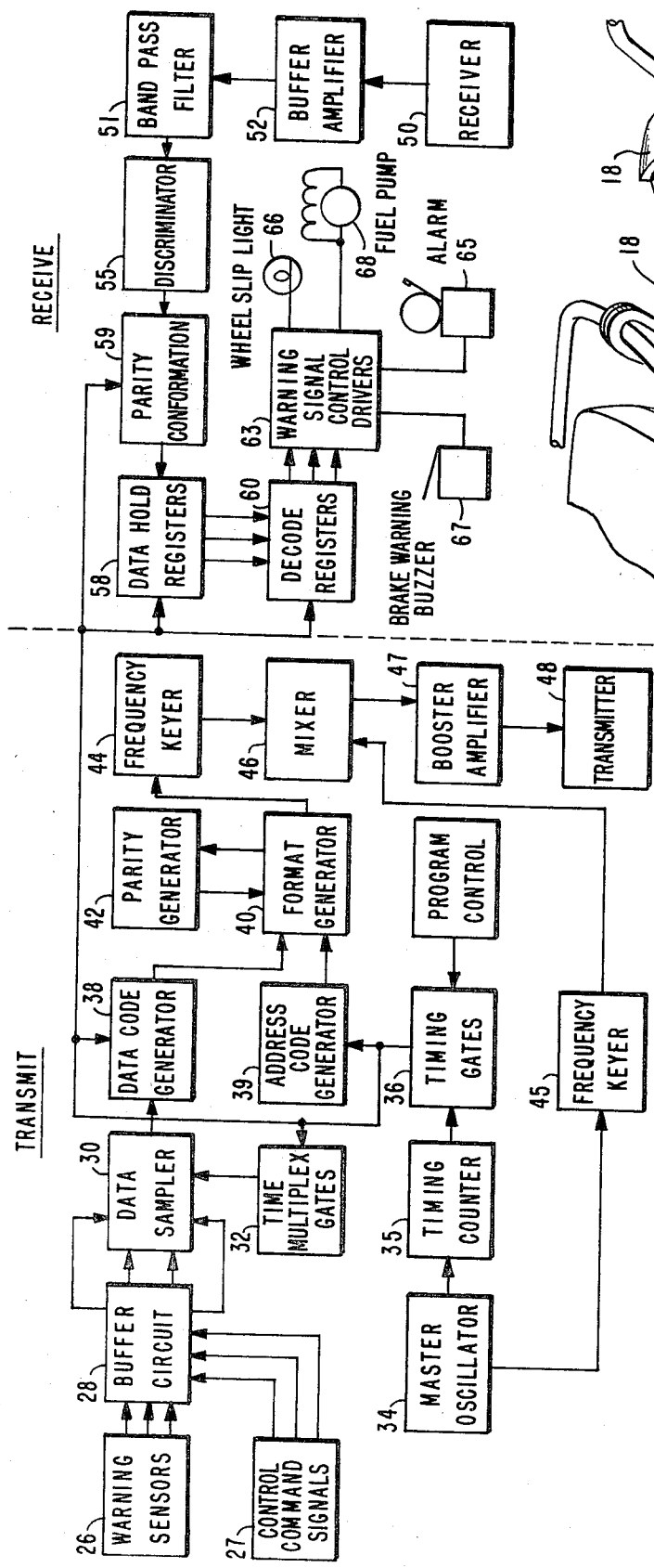
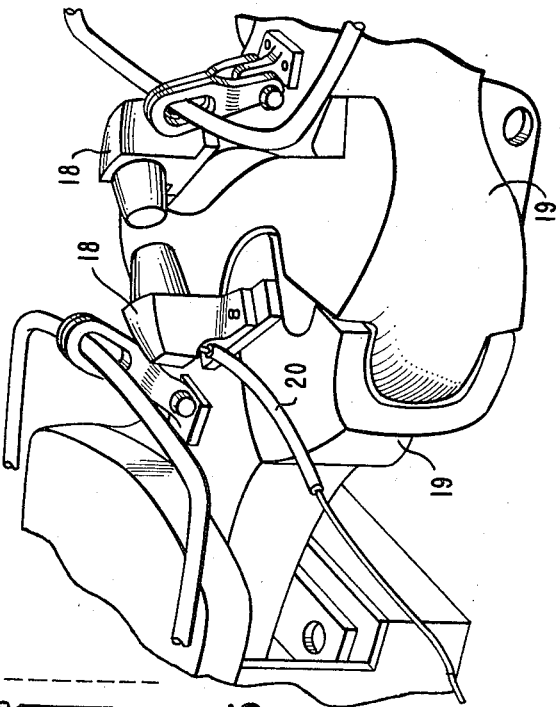
FIG.-5
FIG.-2
INVENTOR.
PETER A. GODINEZ, JR.
BY
FRASER and BOGUCKI
ATTORNEYS

LOCOMOTIVE SIGNALING AND CONTROL SYSTEM

BACKGROUND OF THE INVENTION

1. Field of the Invention

This invention relates to multi-unit railroad locomotive control systems, and more particularly to such systems employing multiplexed signal, electromagnetic transmission through inductively coupled transducers.

2. Description of the Prior Art

The use of multiple power traction units in railroad service has long been commonplace, particularly in long freight trains and high speed passenger service. When steam locomotives were common, it was necessary to have separate crews on each locomotive for operating it in conjunction with the others. Communication between the respective locomotive crews was generally by hand and voice signals, and rapidly became a significant problem with the addition of more units in a given train. With the introduction of diesel electric traction units, however, separate crews for each unit have become redundant, because the diesel electric unit is particularly adaptable to complete control by suitable electrical signaling from a remote point. Thus, it became feasible to use a single crew in a master unit with control signals being directed to slave units (without crew) in the locomotive section.

Other systems for controlling a number of slave power traction units from a single master unit have relied upon the use of multi-pin electrical connectors for wire transmission of signals from one unit to another. This of course requires a separate coupling and uncoupling step when the units are being coupled or uncoupled physically. This is time consuming and places severe strains on the connectors with resultant failure fairly common in regular operation. It is virtually impossible to provide signal coupling by this means between the traction units that are not physically contiguous to each other, as in the case of the units being at opposite ends of a train or at one end and in the middle. In such systems in which all of the units are hooked in series with a single cable, there is a serious problem in the event of a cable failure. When such a cable breaks or a connector fails, there is no indication to the engineer as to the location of the break, and substantial time may be lost in searching through as many as ten power traction units in a single train to locate the failure.

One way by which the necessary signaling between traction units has been accomplished in the past is by the use of radio transmission. However, this is subject to a number of drawbacks, among them being noise interference, capture, fading and the like, fading being a particular problem when a train is going around a curve or passing through a tunnel. Moreover, the use of such systems adds radio frequency signals to an already crowded spectrum thus requiring government approval with FCC control.

SUMMARY OF THE INVENTION

In brief, particular arrangements in accordance with the present invention involve the use of inter-unit coupling devices in the form of inductive transducers which never physically come in contact with each other. However, these are spaced in symmetrical juxtaposition relative to the mechanical coupling device of the individual units so that when two units are coupled together an inductive coupling is established by the physical juxtaposition of the two signal coupling transducers. A digital control/indicator system is employed which encodes and transmits all of the required control signals from the control console in the master traction unit to all of the slave traction units which are coupled together therewith with return of the various warning and other signals needed to provide an indication of the operation of the various slave units at the control console in the master traction unit. In systems in accordance with the invention, no physical electrical connectors are needed to effect the requisite signal transmission. At a display on the control console in the master traction unit, an indicator is provided to inform the engineer in the event of a failure or other malfunction, and to indicate the type of malfunction involved and the particular unit experiencing the malfunction. An encoding system is employed which includes, for each particular signal being transmitted, the address, the digital value of the signal, and a parity checking signal to safeguard against the transmission of errors. The various signals which are available for transmission between the respective units of the train are multiplexed for transmission over the single pair of wires provided for this purpose, with suitable decoding of the multiplexed signals at each of the various units in the train. By virtue of the address associated with each of the signals being transmitted, the signals are decoded and directed to the appropriate control actuator or indicator devices in accordance with each signal.

The digital signals transmitted from the master unit are actually self-clocking since the data is mixed with the clock and then frequency shift-keyed. Signal separation is effected in the slave units by the use of logic circuitry. In accordance with an aspect of the invention, redundant voting, i.e. the comparing of three digital words with the resultant command corresponding to the best two out of three, is utilized on important commands such as forward and reverse control. Furthermore, the value of the command so detected is held for a fixed time interval until the same value is repeated a significant number of times. In one particular embodiment the command value is required to be repeated at least ten times before the command is followed to actuate the control diver. This scheme is utilized in accordance with a further aspect of the invention in order to reduce the possibility of error in interpretation of the control signals. The system is designed to produce a power shutdown within any particular traction unit upon the loss in transmission from the master unit to any one locomotive. The system also is designed to produce a power shutdown if there is a continuous error in the parity of the checking signals, a condition which would indicate either marginal transmission or a system malfunction.

The particular electromagnetic transducer employed in systems in accordance with the invention preferably involves a pair of inductance coils mounted along a common core in a single housing providing suitable environmental protection. The housing is mounted, in one preferred arrangement, on the mechanical coupler of the particular unit in a position such that when two units are mechanically coupled together, the two electromagnetic transducers associate therewith are aligned and spaced approximately 1 inch apart. This spacing is such that a reliable electromagnetic coupling is established between the two for the transmission and reception of signals in either direction. In a single transducer unit, one of the two coils is utilized for transmission of signals to another transducer while the second of the two coils is utilized to receive the signals from the associated transducer. Since the pair of electromagnetically coupled transducers are not physically interconnected in any way, there is no wear or strain on the transducers or associated connecting cables due to the coupling and uncoupling of associated units. Such inductors are completely free from radio frequency interference such as may be generated by the diesel electric power units of the associated locomotives and also do not radiate any radio signals at a level or frequency such as to come within the dominion of the Federal Communications Commission.

The system as constructed utilizes sold state circuitry and the electromagnetic transducers mentioned above. Thus, there are no connectors or moving parts and the system is highly reliable with only routine calibration being required and little or no maintenance necessary.

BRIEF DESCRIPTION OF THE DRAWINGS

A better understanding of the invention may be had from a consideration of the following detailed description, taken in conjunction with the accompanying drawings, in which:

FIG. 2 is a more detailed block diagram of a master locomotive control unit for use in the system of FIG. 1;

FIG. 5 is a perspective view showing the arrangement by which the inductive transducers employed in systems in accordance with the invention are mounted on the mechanical couplers of adjacent locomotives.

DETAILED DESCRIPTION

Figure 1:
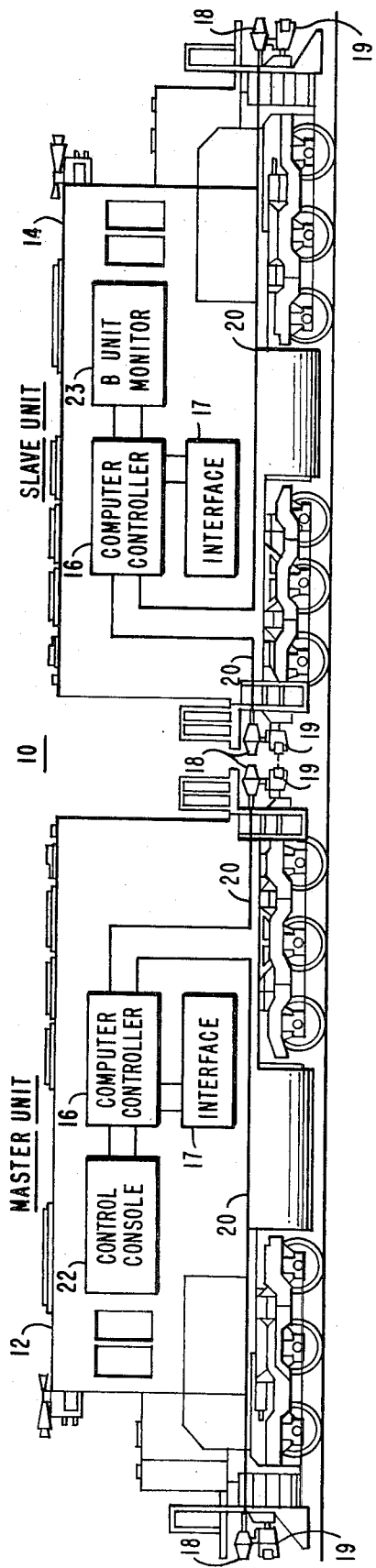
FIG. 1 is a generalized block diagram of one particular arrangement in accordance with the invention.

In FIG. 1, a system 10 in accordance with the invention is shown as comprising a plurality of major subsystems organized and interconnected within a master locomotive ("A" unit) 12 and a slave locomotive ("B" unit) 14. Each unit 12, 14 is shown comprising portions of the system in common to all units including a computer controller stage 16, an interface stage 17 which is peculiar to the particular locomotive involved, whether it be a master unit or a slave unit and of whatever manufacture, inductive couplers 18 positioned adjacent mechanical couplers 19 at opposite ends of the locomotives so that when a pair of locomotives are mechanically coupled together by the joining of the mechanical couplers 19 the inductive couplers 18 are spaced sufficiently close together as to be inductively intercoupled, and suitable interconnecting cables 20 running between the inductive couplers 18 and the electrical control systems.

In addition, the master locomotive 12 is provided with a control console stage 22 containing the controls and indicators which are needed for the master locomotive to provide suitable control of the slave locomotives operating as a unit, whereas the slave locomotive 14 is provided with a B unit monitor 23 which principally comprises sensors for developing signals to be transmitted to the master locomotive 12.

In a preferred arrangement in accordance with the invention, the control console 22 and associated equipment in the controller 16 and interface 17 of the master locomotive 12 have the capability of controlling the following functions in all slave units: governor control, common generator field control, forward control, reverse control, dynamic braking, compressor control, light control at various preset levels, and sanding control. It also receives as a minimum the following warning signals from all slave units such as 14, and has the ability to determine which particular slave unit 14 is generating the warning signals: alarm bell, wheel slip, fuel pump control, brake warning, ground relay, low oil pressure, and hot engine. The warning signals are displayed at the B unit monitor 23 of each individual slave unit as well as the master panel of the control console 22 in the master locomotive 12. In addition, provision is made in the system for adding more controls, indicators, and warning signals simply by connecting additional logic elements; also those features which are not needed may be deleted by eliminating the logic elements pertaining thereto. The system is designed so that the basic computer controller unit 16 functions in either the master locomotive 12 or the slave locomotive 14, the conversion of the system from one to another being accomplished by the external accessories such as the interface 17 and the control and monitor stages 22 and 23 respectively.

A more detailed block diagram of the portion of the system employed in a master, or A unit, locomotive is shown in FIG. 2. Transmission and reception between A and B units is by frequency modulation encoding such that the base carrier frequency is the transmission frequency. This is done in digital fashion by frequency shift keying a self-clocking signal throughout the coupled units.

As indicated in FIG. 2, warning signal are generated by warning sensors 26 which are applied, along with control command signals 27, to a buffer circuit 28 and then to a data sampler 30. The data sampler is controlled by time multiplex gates 32 which receive synchronizing signals from a master clock stage including a master oscillator 34, a timing counter 35 and timing gates 36. In this fashion, each locomotive command function, such as dynamic brake, governor control, and others mentioned above is sampled in the data sampler 30. The value of the command signal is thereafter converted into a digital signal in the data code generator 38 and combined with address identification from the address code generator 39 in the format generator 40. The format generator 40 also adds a parity digit from the parity generator 42 and applies the resulting digital word to the frequency keyer 44. The parity bit is a signal used to check each digital word to ensure that no errors are made in transmission. The frequency keyer 44 serves to convert the series of digital signals comprising the digital word into a frequency suitable for transmission. This is accomplished by making a low frequency transmission for a "zero" state of the digital signal and a high frequency transmission for a binary "one" state of the digital signal.

In order to maintain proper time synchronization of all signals throughout the train, self-clocking is used. This is the master oscillator 34 of the master locomotive 12. The clock synchronizing signal is mixed with data at the mixer 46 for conversion into a self-clocked signal. This signal is then converted to frequency shift keyer 44. The FSK signals from the frequency keyer 44 is then amplified in the booster amplifier 47, and transmitted to the other locomotive units by a transmitter 48. It will be understood that transmission may originate in all units, both master and slave, since warning signals are both received and transmitted.

Figure 3:
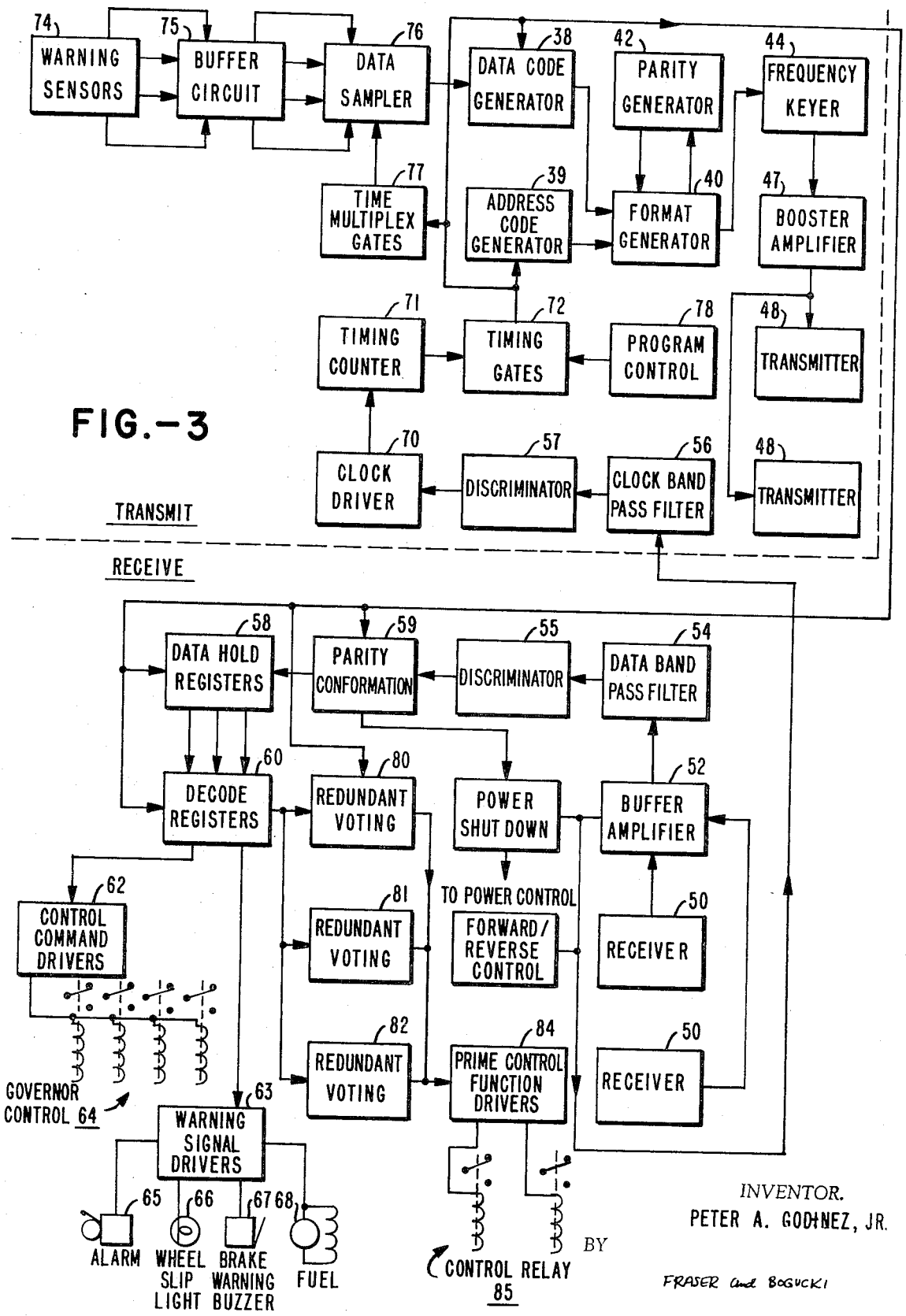
FIG. 3 is a more detailed block diagram of a slave locomotive control unit for use in the system of FIG. 1.

Referring to FIG. 3, the combined signals from the master locomotive 12 are received via one of the receivers 50 for decoding therein and simultaneous retransmission to all succeeding locomotive units. After passing through a buffer amplifier 52, the received signals are separated in the discriminator by means of bandpass filters and individual discriminators 54 and 55, 56 and 57 for the data and clock signals respectively. The command signals are then stored in the data hold registers 58 after parity checking in the parity conformation stage 59. The address portion of the data signal is analyzed and decoded in the decode registers 60 and the command relating to a given address is then directed to a proper driver circuit in the control command drivers stage 62 or warning signal drivers stage 63 for actuation of the appropriate function such as governor control 64, alarm 65, wheel slip light 66, brake warning buzzer 67, fuel pump 68, or other such functions which may be incorporated.

The clock signal from the discriminator 57 (which has originated from the master oscillator 34 in FIG. 2) is employed to provide proper signal timing for the B unit signals by processing via a clock driver 70, a timing counter stage 71 and timing gates 72. The resulting clock signal is used to sample and digitize the warning signals in the B unit. These warning signals are developed by warning sensors 74 via a buffer 75, data sampler 76 and time multiplex gates 77 similar to corresponding stages shown and described in connection with FIG. 2. A program control stage 78 is connected to provide an input to the timing gates 72 to supply rudimentary programs which may be included in the B unit system. Another block such as the data code generator 38, the address code generator 39, the parity generator 42, the format generator 40, the frequency keyer 44, the booster amplifier 47 and dual transmitters 48 are identical to corresponding stages shown in FIG. 2 and have been numbered accordingly. It will be noted in the system of FIG. 3 for the B unit locomotives, that dual transmitters 48 and receivers 50 are provided for transmission and reception of signals from both ends.

The receiver portion of the A unit system of FIG. 2 operates in similar fashion to the reception of signals in the B unit by the circuitry represented in FIG. 3. The signals are received in the receiver 50, amplified in the buffer amplifier 52 and then passed through a bandpass filter 51 to a discriminator 55, and thence to the data hold registers 58 after checking for parity in the parity confirmation stage 59. Signals are decoded in the decoding registers 60 and directed to the appropriate warning signal drivers 63 for actuation of the appropriate function element such as 65, 66, 67, or 68.

Referring again to FIG. 3, particularly important signals such as the forward and reverse commands are transmitted in triplicate for maximum reliability. The best two out of three words are selected to determine the proper command. This is accomplished by means of the redundant voting stages 80, 81 and 82 in the receive portion of FIG. 3 which respond to signals stored in the decoder registers 60. In this manner all command signals are stored for a period of time and are compared from one sample to the next in order to confirm the correct information, thus eliminating the possibility that errors or a failure might cause a malfunction of critical signals. The output of the redundant voting stages 80, 81 and 82 is applied to the important or prime control function drivers 84 and thence to actuate the appropriate function in the control relay 85.

Figure 4:
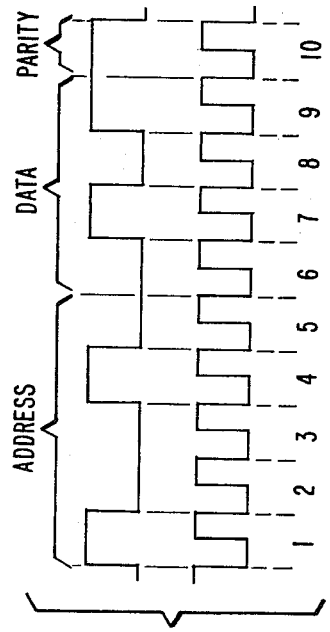
FIG. 4 is a diagram representing a typical modulation sequence for signaling between units in the system of FIG. 1.

The composition of a command signal is represented in FIG. 4. The command signal proper is represented by the upper waveform which includes various binary digital values, the first five digits of which represent the address of the command, the next four digits correspond to the data determining the command with the final digit being tacked on for a parity check. Also shown in FIG. 4 as the lower waveform is the clock synchronizing signal. The two waveforms are arranged so that the change of binary state in the command signal occurs simultaneously with the drop in frequency of the frequency shift keying for the clock signal. The next digital word starts on the next time space and is also ten time spaces long. All successive words are combined in sequency and comprise the digitizer output from the format generator 40. All controls for the combined master and slave locomotives originate in the master locomotive unit. The commands are sampled one at a time approximately 15 times a second and are transmitted to all slave units simultaneously. Warning signals developed by the sensors 26 of FIG. 2 and 74 of FIG. 3 are also sampled at the same rate. The master sync clock is mixed with the command signals and the combined signals are sent to all slave units. Since self-clocking is used no synchronization problems between units can occur. In order to change a control function, there must be a continuous repitition of the change over and over, and one error command different from a number of correct commands will not affect the control. As mentioned, a malfunction or a loss in communication will automatically shut down the locomotive as a failsafe precaution.

The parity generator 42 works by counting the number of binary ones of the address code and data code together to determine if the number is odd or even. The parity bit is added so as to make the total number of one states odd. In the receive portion, each digital word is checked in the parity confirmation stage 59 and the entire word is rejected if the total number of one states of the signal is not an odd number.

FIG. 5 illustrates a pair of inductive coupling units 18 and corresponding mechanical couplers 19 in relative positions such that when two adjacent traction units are hooked together by means of the mechanical couplers 19, the inductive couplers 18 are spaced approximately 1 inch apart and appropriately aligned so that there is inductive coupling between the two. Each coupler 18 is provided with a cable such as 20 for connection to the systems on the associated locomotive.

Figure 6:
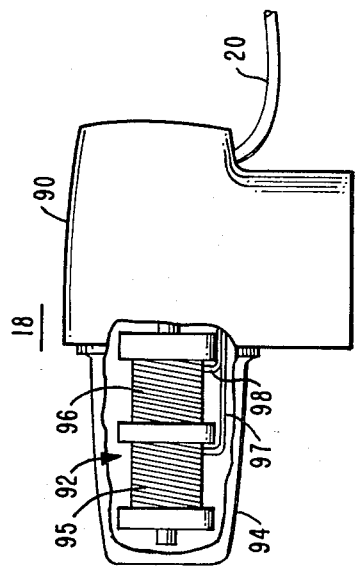
FIG. 6 is a side view, partially broken away, of an inductive coupling unit of FIG. 5, showing a pair of transducers mounted therein.

The interior details of the construction of the transducer element within the inductive coupler 18 are shown in FIG. 6 in a partially broken away view. The inductive coupler 18 includes a metal housing 90 suitably shaped to permit rigid mounting of the coupler 18, preferably on the associated mechanical coupler 19. A transducer 92 is fastened to an interior face of the housing 90 in a recess therein, and covering 94 of rubber or soft plastic is affixed in position thereover and sealed against the housing 90 to protect the transducer 92 from the environment. The transducer 92 comprises a pair of individual inductive coils 95 and 96 wound on a common spool with a common core, but with individual connections provided by the connecting wires 97 and 98 respectively. The outermost coil 95 is preferably the receive coil, whereas the inner coil 96 is used for transmitting signals. The transducer 92 may be completely encapsulated in epoxy if desired to provide protection against extreme weather conditions. The particular arrangement of the coupler 18 provides an extremely rugged and reliable transducer unit which is impervious to weather conditions and withstands the vibrations and other abuse of normal use.

A pair of such units positioned as shown in FIG. 5 readily accomplishes the desired transmission of signals from one locomotive to another without any of the problems resulting from prior systems utilizing radio links and without the necessity for the physical plugging and unplugging previously required in systems using direct wire connections with the attendant troubles of connector failure, wire breakage, and the like. Because of the automatic coupling and uncoupling capability of the inductive coupling units 18 which establish the desired inductive coupling between the two adjacent units by virtue of the proximity without any actual contact, and without the need for the additional step of manual coupling and uncoupling which is required in the directly connected wire systems, it is feasible to provide railroad cars in certain circumstances with inductive couplers 18 and cables 20 extending between them along the length of the car so that the desired control between traction units which are not directly coupled together may be achieved. The use of the digital signaling with parity check as described enhances the reliability of systems in accordance with the invention, and the overall system is of such a design that it is particularly suitable to the use described herein.

Although there have been described above specific arrangements of a locomotive signaling and control system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed i:

1. A locomotive control system for controlling the operation of one or more slave locomotive units in unison from a master locomotive control unit, said locomotive units having mechanical couplings, said system comprising:
    a master control stage in said master locomotive unit for generating and transmitting digital electrical signals in accordance with predetermined control functions;
    remote slave apparatus in said slave locomotive units for receiving electrical signals from the master control stage and converting said signals into actuator signals corresponding to the predetermined control functions; and
    signal transmission means for providing communication between the master control stage and the slave apparatus comprising a plurality of inductive couplers each including a transducer mounted on the mechanical couplings of said master and slave locomotive units in a position such that inductive coupling between the transducers thereof is established when a pair of master and slave locomotive units are coupled together.

2. A system in accordance with claim 1 wherein said slave apparatus further includes means for generating predetermined warning signals for transmission to the master control stage via said signal transmission means.

3. A system in accordance with claim 2 wherein the master control stage further includes a plurality of display devices responsive to said warning signals.

4. A system in accordance with claim 2 wherein the master control stage further includes means responsive to certain of said warning signals for developing actuating signals in response thereto.

5. A system in accordance with claim 1 wherein the master control stage further includes means for repetitively transmitting preselected ones of said digital electrical signals to ensure desired control of the slave locomotive unit.

6. A system in accordance with claim 5 wherein the slave apparatus includes means for comparing said repetitive signals for the same function from the master control stage and means for responding to a majority vote of the compared signals.

7. A system in accordance with claim 1 wherein the inductive couplers comprise means for affixing said couplers to the mechanical couplings of the locomotive units in symmetrical juxtaposition to face each other with a separation of approximately one inch when a pair of locomotive units are mechanically coupled together.

8. A system in accordance with claim 1 wherein each inductive coupler comprises a rigid housing, an inductive transducer fastened to said housing; and
    a protective covering enclosing the inductive transducer and affixed to the housing in sealing relationship.

9. A system in accordance with claim 8 wherein the inductive transducer comprises a pair of separate coils positioned on a common core, one of said coils being utilized for signal transmission and the other of said coils being utilized for signal reception.

10. A system in accordance with claim 1 wherein said master control stage includes means for developing an address corresponding to a given command signal and transmitting said address and command signal together to the slave apparatus.

11. A system in accordance with claim 10 wherein the slave apparatus includes means for decoding said address signal and for responding only to signals bearing addresses within the corresponding slave unit.

12. A system in accordance with claim 11 wherein said slave apparatus includes means for directing a particular command signal to a control actuator in accordance with the address associated with the signal.

13. A system in accordance with claim 10 wherein the slave apparatus further includes means for retransmitting signals associated with addresses corresponding to other slave locomotive units.

14. A system in accordance with claim 1 wherein the master locomotive control unit includes means for shutting down the power of a given slave locomotive unit upon the reception of signals indicating a garbled transmission.

15. A system in accordance with claim 14 wherein the master locomotive control unit further includes means for shutting down a slave locomotive unit upon the existence of a condition indicating a breakdown in signal transmission.

16. A system in accordance with claim 10 wherein the master control stage further includes means for affixing a parity digit to the address and command signals to be transmitted.

17. A system in accordance with claim 16 wherein the slave apparatus includes parity checking circuitry and means for rejecting a command signal for which a parity error is detected.

18. A system in accordance with claim 1 wherein the master control stage and the slave apparatus each include identical computer controllers and particular interface units for adapting the identical computer controllers to the particular type of power unit in which the controller is to be mounted.

19. A control system in accordance with claim 1 wherein timing means is provided by self-clocking time synchronization of said digital signals in both said master control unit and said slave units.

20. A locomotive signaling and control system for controlling a plurality of diesel/electric power traction units in unison from a master unit comprising:
   a computer controller in each of said units for processing digital electrical signals in self-clocking relationship;
   a control console coupled to the computer controller of the master unit for generating control signals and for providing a display of operating conditions throughout the locomotive;
   function controllers in each unit coupled to the output of the computer controller therein and responsive to actuating signals from the associated computer controller;
   warning sensors in each of said computer controllers for generating signals for application to the control console;
   means in each computer controller for developing a digital signal word comprising an address portion, a command portion, and a parity bit in accordance with each of said control and warning signals, said digital signal word being time-synchronized with an accompanying clock signal; and
   means for transmitting said digital electrical signals between units including pairs of inductive couplers electrically connected to respective computer controllers and mounted on said units in positions such as to establish inductive signal coupling between the couplers without electrical contact when the units are physically coupled together.

21. A control system for controlling the operation of a multi-unit locomotive, including:
   a master locomotive unit;
   at least one slave locomotive unit, said master and slave units being joined by mechanical couplers; and
   a control signal transmission system linking said units and including an inductive coupling mounted on each of said mechanical couplers, the inductive couplings of joined, adjacent mechanical couplers being juxtaposed for inductive interconnection without physical contact therebetween.

* * * * *